(12) United States Patent
Boomhour

(10) Patent No.: US 9,207,714 B2
(45) Date of Patent: Dec. 8, 2015

(54) SUPPORT FOR A PORTABLE ELECTRONIC DEVICE

(71) Applicant: BLACKBERRY LIMITED, Waterloo (CA)

(72) Inventor: Benjamin William Boomhour, Waterloo (CA)

(73) Assignee: BlackBerry Limited, Waterloo (CA)

( * ) Notice: Subject to any disclaimer, the term of this patent is extended or adjusted under 35 U.S.C. 154(b) by 191 days.

(21) Appl. No.: 13/957,214

(22) Filed: Aug. 1, 2013

(65) Prior Publication Data
US 2015/0036282 A1    Feb. 5, 2015

(51) Int. Cl.
G06F 1/16    (2006.01)
H05K 5/00    (2006.01)
H05K 7/00    (2006.01)
F16M 13/00   (2006.01)
F16M 11/00   (2006.01)

(52) U.S. Cl.
CPC ............ *G06F 1/1632* (2013.01); *F16M 11/00* (2013.01)

(58) Field of Classification Search
CPC ...................... G06F 1/1632; F16M 11/00
See application file for complete search history.

(56) References Cited

U.S. PATENT DOCUMENTS

| | | | | |
|---|---|---|---|---|
| 5,899,421 A * | 5/1999 | Silverman | ...................... | 248/175 |
| 6,042,414 A * | 3/2000 | Kunert | ................. | 439/374 |
| 6,366,450 B1 * | 4/2002 | Janicek | ..................... | 361/679.41 |
| 7,808,779 B2 | 10/2010 | Lum et al. | | |
| 7,889,494 B2 * | 2/2011 | Stampfli | ................. | 361/679.42 |
| 7,969,732 B1 * | 6/2011 | Noble | .................. | 361/679.56 |
| 8,145,821 B2 * | 3/2012 | Mead et al. | .................. | 710/303 |
| 8,228,670 B2 * | 7/2012 | Fahey et al. | ............. | 361/679.32 |
| 8,422,206 B2 * | 4/2013 | Fu et al. | .................... | 361/679.01 |
| 8,550,343 B2 * | 10/2013 | Ko | ................. | 235/383 |
| 8,654,522 B2 * | 2/2014 | Ishida | ..................... | 361/679.41 |
| 8,811,007 B2 * | 8/2014 | Zhou | ................... | 361/679.41 |
| 8,879,246 B2 * | 11/2014 | Fahey et al. | ............. | 361/679.32 |
| 2011/0075349 A1 * | 3/2011 | Ma et al. | .................... | 361/679.41 |
| 2012/0194993 A1 * | 8/2012 | Oguchi et al. | ............ | 361/679.41 |
| 2013/0068917 A1 * | 3/2013 | Peng | ............................ | 248/558 |
| 2013/0088830 A1 * | 4/2013 | Lim | ............................ | 361/679.43 |
| 2013/0135512 A1 * | 5/2013 | Kim et al. | ..................... | 348/335 |
| 2014/0110556 A1 * | 4/2014 | Mao | ............................ | 248/558 |

* cited by examiner

*Primary Examiner* — Hoa C Nguyen
*Assistant Examiner* — Xanthia C Cunningham
(74) *Attorney, Agent, or Firm* — Geoffrey deKleine; Borden Ladner Gervais LLP

(57) ABSTRACT

A support includes a device-receiving groove for receiving a portable electronic device. A center of gravity of the support being selected to bias the support to remain in a device-receiving position when no portable electronic device is received therein and bias the support to remain in an upright position when the portable electronic device is received therein.

20 Claims, 10 Drawing Sheets

SUPPORT FOR A PORTABLE ELECTRONIC DEVICE

TECHNICAL FIELD

The present application relates to supports for portable electronic devices, including docks for portable electronic devices.

BACKGROUND DISCUSSION

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), tablets and laptop computers with wireless 802.11 or Bluetooth capabilities.

Portable electronic devices such as PDAs or smart telephones are generally intended for handheld use, that is, the devices are sized and shaped to be held or carried in a human hand, and ease of portability. Portable electronic devices are often placed in supports when not in handheld use. Some supports, which may be referred to as docks, enable charging or data transfer including transfer of information in any form optically or electrically from dock to portable electronic device and vice versa.

BRIEF DESCRIPTION OF THE DRAWINGS

Embodiments of the present application will now be described, by way of example only, with reference to the attached Figures, wherein.

DETAILED DESCRIPTION

Figure 1:
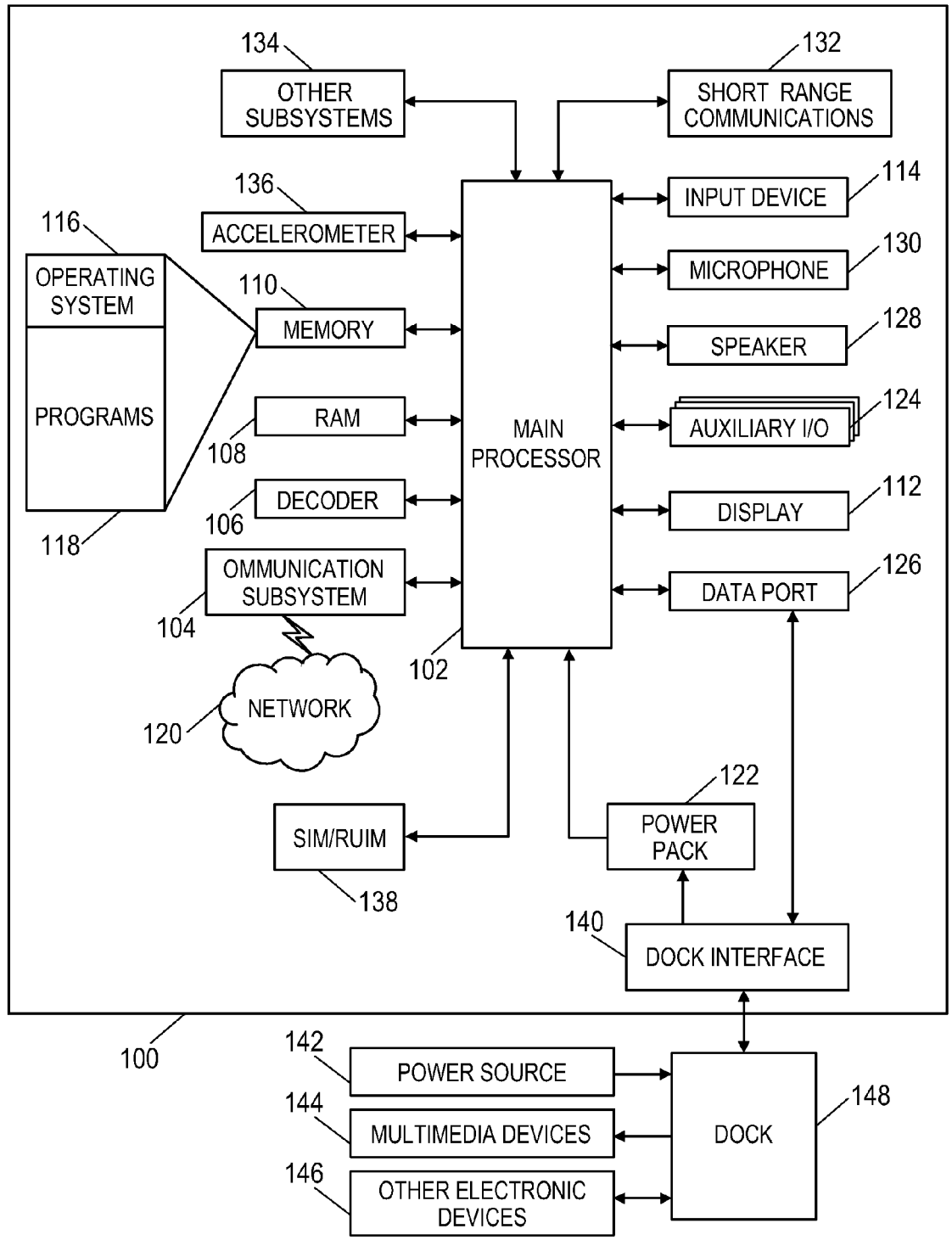
FIG. 1 is a simplified block diagram of components including internal components of a portable electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The disclosure generally relates to a support for a portable electronic device in the embodiments described herein. As will be described, the support may be a dock, for example. A centre of gravity of the support may be selected to bias the support to remain in a device-receiving position when no portable electronic device is received therein and bias the support to remain in an upright position when the portable electronic device is received therein. The support may receive portable electronic devices including: mobile, or handheld, wireless communication devices such as pagers, cellular phones, cellular smart-phones, wireless organizers, tablets, music players, global positioning system devices and personal digital assistants, for example. The portable electronic device may also be a portable electronic device without wireless communication capabilities, such as a handheld electronic game device, digital photograph album, digital camera, or other device. As may be clear from context, terms used herein such as "up" and "down" and "upright" and "horizontal" may be understood in relation to the centre of gravity and the gravity of the Earth. Generally speaking, any direction or orientation includes approximations of that direction or orientation. For example, "up" includes the direction that strictly points away from the centre of the Earth as well as directions that have a substantial upward component.

In an aspect of the present disclosure there is provided a support for receiving a portable electronic device, the support comprising: a base; and a seat mechanically coupled to the base and rotatable relative to the base, the seat comprising a first portion, a second portion and a device-receiving groove defined by a front wall, a back wall and a side wall, the side wall located between the front wall and the back wall, the second portion coupled to the first portion at a right angle and the seat being sized for receiving the portable electronic device and being movable between a device-receiving position and an upright position; wherein a center of gravity of the seat is located to bias the seat toward the device-receiving position in which the device-receiving groove of the second portion is upward facing.

In another aspect of the present disclosure there is provided a support for receiving a portable electronic device, the support comprising: a base; and a seat mechanically coupled to the base, the seat comprising a first portion, a second portion and a device-receiving groove defined by a front wall, a back wall and a side wall, the side wall located between the front wall and the back wall, the second portion coupled to the first portion at a right angle and the seat being sized for receiving the portable electronic device and movable between a device-receiving position and an upright position; wherein a center of gravity of the support is located to bias the support toward the device-receiving position.

Other aspects and features of the present disclosure will become apparent to those ordinarily skilled in the art upon review of the following description of specific embodiments in conjunction with the accompanying figures.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 120. The wireless network 120 may be any type of wireless network, including, but not limited to, data wireless networks, voice wireless networks, and networks that support both voice and data communications.

A power pack 122, such as one or more rechargeable batteries or a port to an external power supply, powers the portable electronic device 100. A dock interface 140 may electrically communicate with a dock 148 to charge the power pack 122 and/or provide a data connection to a data port 126 of the portable electronic device 100. In general, components electrically communicate with one another when the electrical activity in one component affects an electrical activity in another. Electrical communication includes direct electrical contact that enables current flow. The dock interface 140 may include one or more mating connectors or other structures for electrically communicating with connectors of the dock 148. An example of a dock interface 140 may be a Universal Serial Bus (USB) receptacle. The dock 148 may electrically communicate with one or more of a power source 142, multimedia devices 144 such as televisions, monitors, projectors or other output devices, for example, and other electronic devices 146. In some situations, communication may be electrical or optical or a combination of electrical and optical. The dock may take any form and may be incorporated into the support of the present application, as will be described.

The processor 102 interacts with other components, such as Random Access Memory (RAM) 108, memory 110, a display 112 (which may include a touch screen), an input device 114 (such as a touch screen or a button on a keyboard), an auxiliary input/output (I/O) subsystem 124, a data port 126, a speaker 128, a microphone 130, short-range communications 132, and other device subsystems 134. The processor 102 may interact with an orientation sensor such as an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 120. Alternatively, user identification information may be programmed into memory 110.

The portable electronic device 100 includes an operating system 116 and software programs or components 118 that are executed by the processor 102 and are typically stored in a persistent, updatable store such as the memory 110. Additional applications or programs may be loaded onto the portable electronic device 100 through the wireless network 120, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 120 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
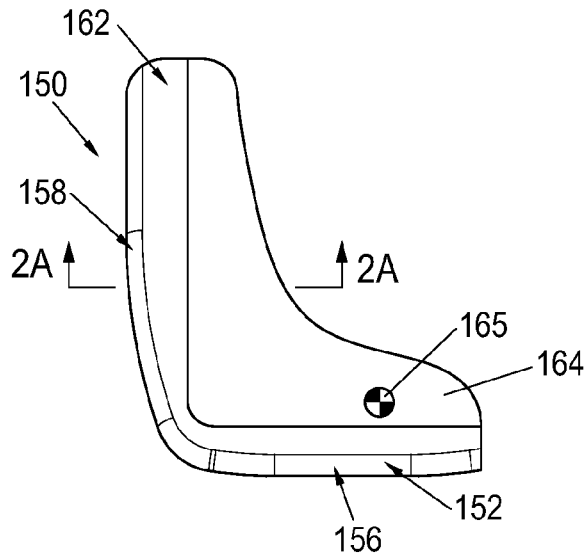
FIG. 2 is a front isometric view of a support in a device-receiving position according to an embodiment.
Figure 3:
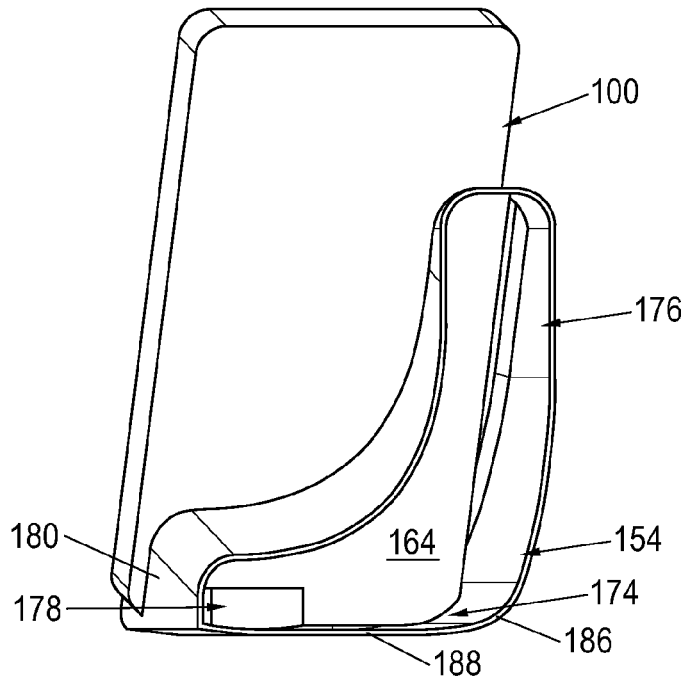
FIG. 3 is a rear isometric view of the support of FIG. 2 with the portable electronic device fully received in the support.

Referring now to FIGS. 2 and 3, an example support 150 for receiving the portable electronic device 100, for example, is shown. The support 150, or the various components thereof, may be constructed from any material or combination of materials, such as plastics, polymers, rubber, metal, silicone and ceramic, for example. The support 150 includes a seat 152 and a base 154. The seat 152 is mechanically coupled to the base 154 so that the portable electronic device 100 is supported in a position in which the portable electronic device 100 is tilted backwards at an angle. Although optional, the backward tilt of the seat 152 relative to the base 154 allows for the display 112 of the portable electronic device 100 to be tilted upwards for convenient viewing by a user when the support 150 is located on a desk, for example. Generally speaking, components are "mechanically coupled" or "physically coupled" when they are attached or connected or joined to one another, in any fashion, whether releasably or substantially permanently, so that physical activity of one component generally affects the other. The physical attachment may be direct or by way of one or more intermediate elements. According to context, two components that are physically coupled may behave as a single element. In some cases, physically coupled elements may be integrally formed, e.g., part of a single-piece article that may share structures and materials. In other cases, physically coupled elements may comprise discrete components that may be fastened together in any fashion. Physical coupling may also include a combination of discrete components fastened together, and components fashioned as a single piece.

Figure 2A:
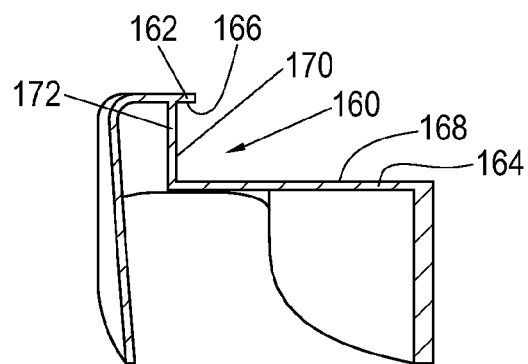
FIG. 2A is a view on 2A-2A of FIG. 2.

The seat 152 includes a first portion 156 and a second portion 158. The second portion 158 extends at a right angle relative to the first portion 156. As used herein, "right angle" includes angles that are exactly or strictly right angles as well as angles that are approximately or substantially right angles. Referring also to FIG. 2A, a device-receiving groove 160 extends between a front wall 162 and a back wall 164 of the seat 152. The device-receiving groove 160 a channel or other structure or structures that is sized for receiving a thickness of the portable electronic device 100. As used herein, the term "sized" may include having one or more dimensions or shapes or configurations. As shown in FIG. 2A, the groove 160 is defined by a back-facing surface 166, a back surface 168 and a side surface 170 of side wall 172, which extends between the front wall 162 and the back wall 164. Put another way, the side wall 172 may connect the front wall 162 to the back wall 164, and thereby define the groove 160. A centre of gravity 165 of the support 150 biases the support 150 toward the device-receiving position. In the example shown in FIG.

2, the support 150 is one piece. The seat 152 and base 154 may alternatively be separate parts that are coupled to one another by an adhesive or fasteners, for example.

The back wall 164 is sized to support a corner of the portable electronic device 100 so that the portable electronic device 100 does not fall out of the support 150 when the support 150 is in an upright position, which is shown in FIG. 3. The portable electronic device 100 may be held by the support 150 in any number of ways, such as with friction or partial vacuum or with mechanical structures such as ridges, clasps, grooves or protrusions. It may be said that the portable electronic device 100 is removably received or removably held by the support 150, in that the portable electronic device 100 is held securely enough that the portable electronic device 100 does not fall out or otherwise accidentally disengage from the support 150 under normal usage, but the portable electronic device 100 may be deliberately disengaged from the support 150 by a user, usually without a need for any tools. In the embodiment in which there is no backward tilt of the seat 152 relative to the base 154, the back wall 164 and the front wall 162 may be similarly sized.

Because the seat 152 is for receiving the portable electronic device 100, the angle between the first portion 156 and the second portion 158 and the size and shape of the groove 160 may be customized for a particular type or brand of portable electronic device 100. In general, the portable electronic device 100 should slide into the seat 152 without too much effort by the user. Once received in the support 350, the portable electronic device 100 may fit snugly so as to not fall out of the seat 152 if some movement of the support 350 occurs. In one embodiment, the angle between the first portion 156 and the second portion 158 is substantially a right angle, which includes angles that are near ninety degrees, such as angles greater than ninety degrees and less than ninety degrees, for example. In another embodiment, the first portion 156 and the second portion 158 are at exactly a right angle relative to one another.

Figure 4:
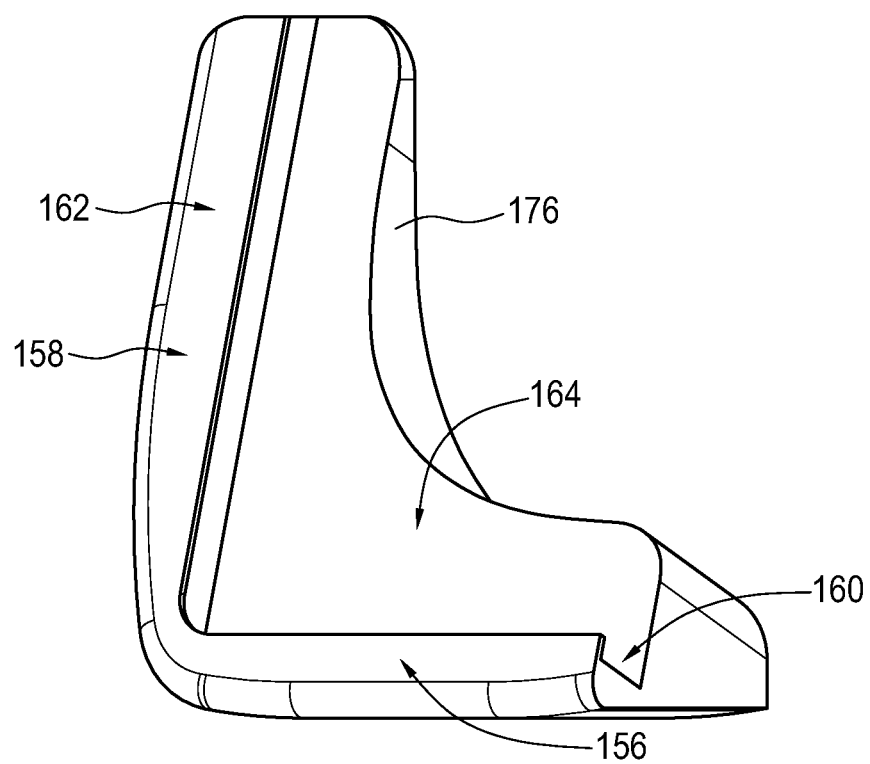
FIGS. 4 and 5 are further isometric views of the support of FIG. 2.
Figure 5:
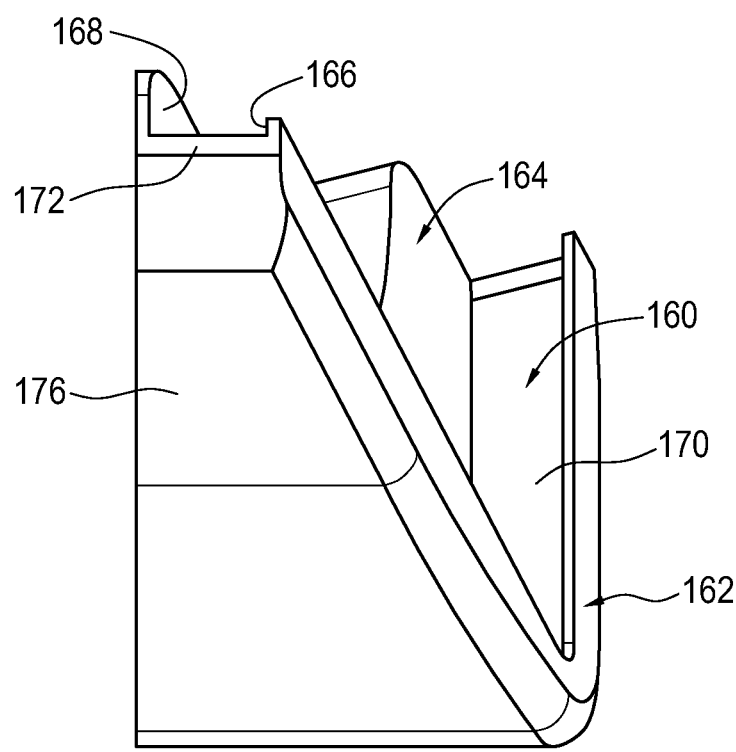

As shown in FIGS. 3, 4 and 5, the base 154 includes a surface-contacting wall 174 that extends backward from the seat 152 and a stiffening wall 176 that extends backward from the back wall 164. The surface-contacting wall 174 includes a curved portion 186 and a flat portion 188. A weight 178 is coupled to the base at a location adjacent an inside surface of the surface-contacting wall 174 near an end 180 of the first portion 156 of the seat 152. The weight 178 causes a centre of gravity of the support 150 to be located at a selected location. The weight 178 may be a separate part that is coupled to the support 150, as shown in FIG. 3, or may be integral with the support 150. The position of the weight 178 may be fixed or adjustable.

Although the surface-contacting wall 174 and the stiffening wall 176 of the base 154 are shown as continuous in FIG. 3, one or both may include one or more cutouts. For example, the base 154 may be a wireframe. Similarly, one or both of the front wall 162 and the side wall 172 may include one or more cutouts.

Figure 6:
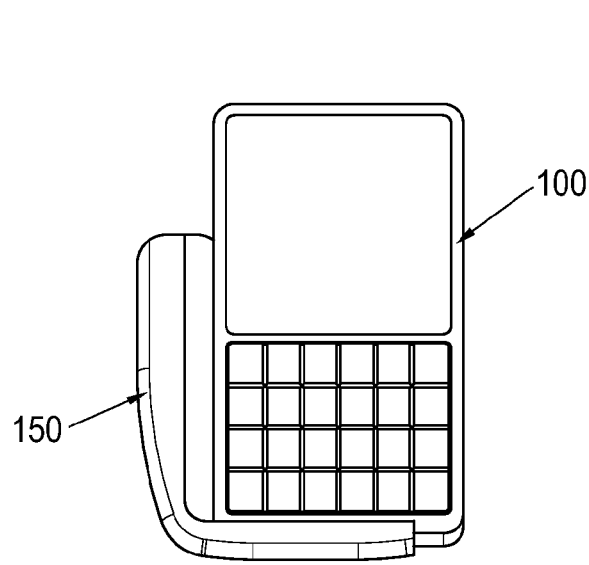
FIG. 6 is a front isometric view showing the support of FIG. 2 receiving the portable electronic device.
Figure 7:
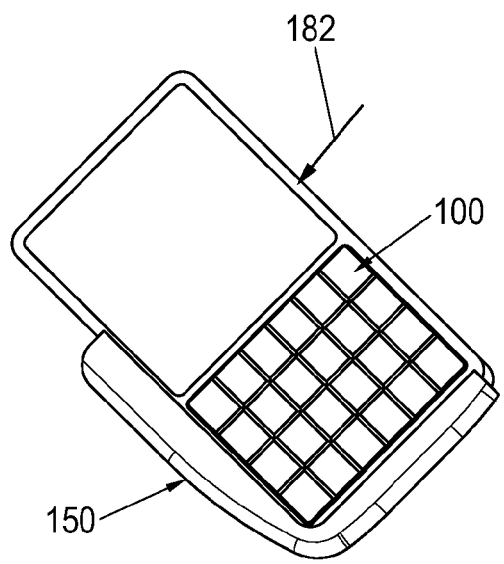
FIG. 7 is another front isometric view showing the support of FIG. 2 in an intermediate position and the portable electronic device received therein.
Figure 8:
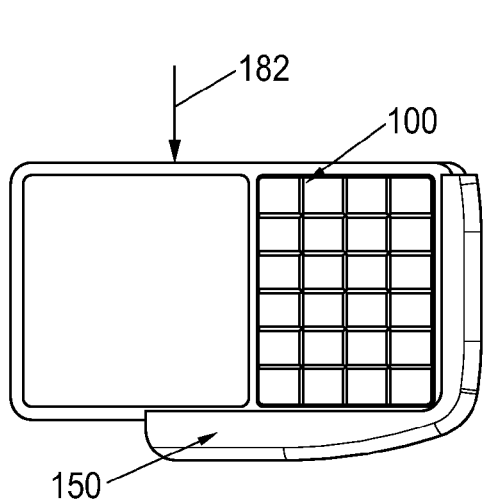
FIG. 8 is another front isometric view showing the support of FIG. 2 in another intermediate position with the portable electronic device received therein.

Operation of the support 150 will now be described with reference to FIGS. 6-9. Prior to receiving the portable electronic device 100, the support 150 rests in the device-receiving position of FIG. 2. In the device-receiving position, the centre of gravity 165 causes the support 150 to rest in a position that is generally upright in which the flat portion 188 of the surface-contacting wall 174 is in contact with a surface on which the support 150 sits, such as a desk or a table, for example. As will be discussed below, in some embodiments, the support 150 may naturally rest on the curved portion 186 rather than strictly on the flat portion 188. The portable electronic device 100 is then inserted into the device-receiving groove 160 of the support 150 by a user, as shown in FIG. 6. The user typically pushes the portable electronic device 100 and support 150 through the intermediate position of FIG. 7 into a horizontal position of FIG. 8, as indicated by arrow 182, in order to fully seat the portable electronic device 100 in the support 150. When in the horizontal position, the user releases the portable electronic device 100 and the gravitational force acts on the combined centre of gravity of the support 150 and portable electronic device 100 (that is, the support 150 and portable electronic device 100 may be held together so as to behave as a single body or object) to rotate the combined support 150 and portable electronic device 100 past the intermediate position of FIG. 7 and into the upright position of FIG. 9. This rotation to upright may occur without any further action by the user, or by any expenditure of electrical power. The portable electronic device 100 and support 150 may simply "pop-up" to the upright position. Further, the upright position may resist physical disturbance; if the user touches or tips the electronic device 100 and support 150 to the side, the electronic device 100 and support 150 may promptly return to the upright position.

Figure 9:
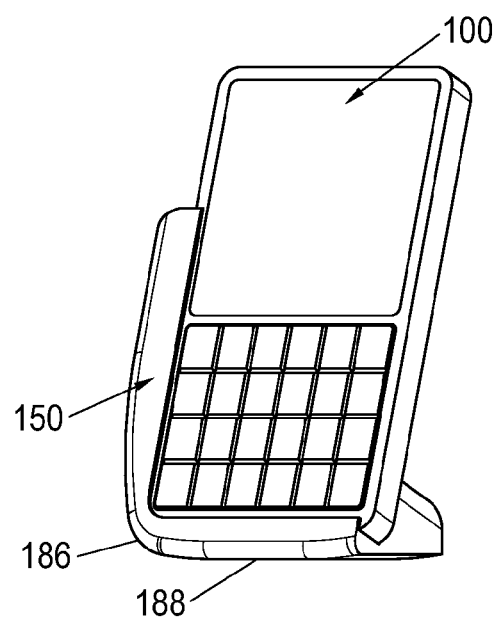
FIG. 9 is yet another front isometric view showing the support of FIG. 2 in an upright position with the portable electronic device received therein.

In the upright position, the second portion 158 of the seat 152 may be substantially upright or strictly upright causing the portable electronic device 100 received therein to be substantially upright or strictly upright. Substantially upright may be any position in which information on the display 112 that is displayed in the portrait orientation may be easily viewed by a user. Strictly upright is a position in which the second portion 158 is normal to a surface on which the support 150 sits. In a typical implementation, the portable electronic device 100 may be oriented upright such that information on the display 112 will appear correctly, but the plane of the portable electronic device 100 may be inclined from perpendicular to the surface, such as is depicted in FIG. 9.

In one embodiment, the device-receiving position and the upright position are generally the same. In another embodiment, the device-receiving position is tilted from the upright position. The tilted device-receiving position may be any position between the positions shown in FIGS. 6 and 7, for example. As will be understood by a person skilled in the art, the device-receiving position is the position at which the support 150 rests when no portable electronic device 100 is received therein and no external force is applied thereto. Therefore, the device-receiving position may be adjusted by moving the location of the centre of gravity 165. The centre of gravity 165 may be moved by changing one or both of the location and weight of the weight 178. Alternatively, additional weight may be added at a selected location on the support 150, for example.

Figure 10:
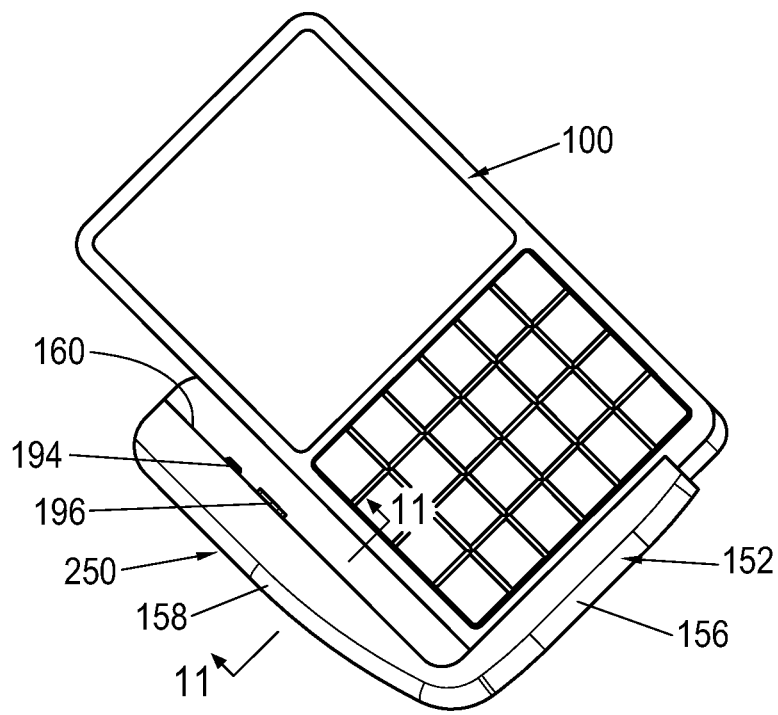
FIG. 10 is a front isometric view of a support according to another embodiment.
Figure 11:
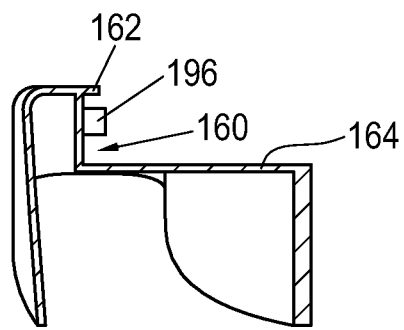
FIG. 11 is a view on 11-11 of FIG. 9.
Figure 12:
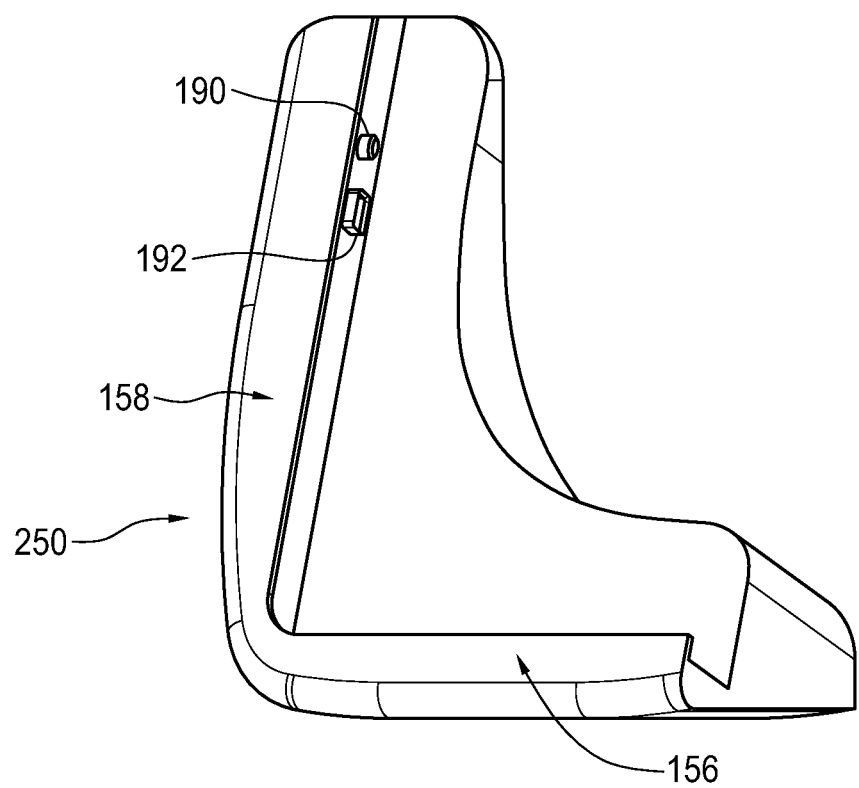
FIG. 12 is another front isometric view of the support of FIG. 10.

Referring to FIG. 10, in another embodiment, a support 250 includes the functionality of the dock 148 described in with respect to FIG. 1. As shown in FIGS. 11 and 12, a first aperture 190, which is defined by a first surface, extends through the side wall 172 of the second portion 158. A second aperture 192, which is defined by a second surface, also extends through the side wall 172.

Figure 13:
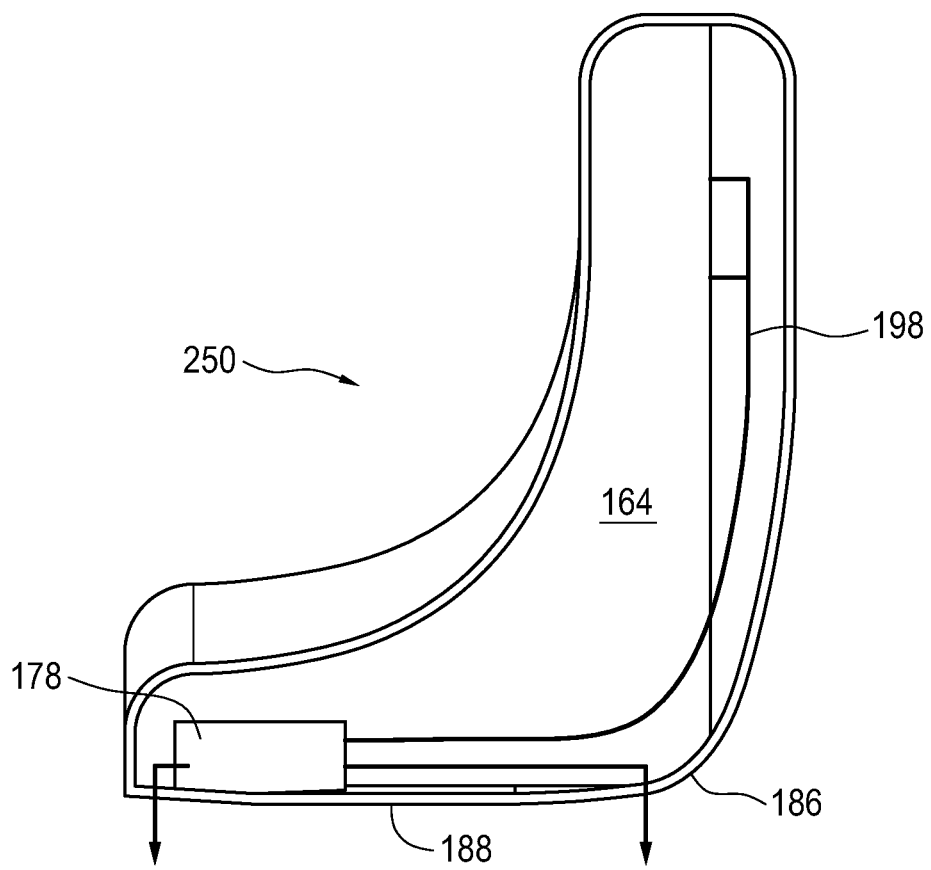
FIG. 13 is a rear isometric view of the support of FIG. 10 showing wiring of the connectors of the support.

A connecting portion of a first connector 194 extends through the first aperture 190. The first connector 194 may be a charging connector, a data connector or a connector capable of both charging and data transfer. The first connector 194 may support an electrical connection, an optical connection or a combination thereof. A connecting portion of a second connector 196 extends through the second aperture 192. Similar to the first connector 194, the second connector 196 may be a charging connector, a data connector or a connector capable of both charging and data transfer. The second connector 196 may support an electrical connection, an optical connection or a combination thereof. The first and second connectors 194 and 196 may be the same type or different types of connectors. An example of a second connector 196 may be a USB plug, which may mate to a USB receptacle. Referring to FIG. 13, wiring 198, 200 of the first and second connectors, 194 and 196, respectively, extends outward from the back of the support 250. Rotational connectors may be provided between the connectors 194, 196 and the wiring. The location of the wiring 198, 200 in the support 250 is factored in when selecting the mass and location of the weight 178. As shown in FIG. 13, the wiring 198, 200 exits the support 250 at opposite sides of the surface-contacting wall 174. In one embodiment, the wiring 198 and 200 exits the support 250 at a location near the end 180 of the first portion 156 of the seat 152. In this embodiment, the wiring 198, 200 functions as a weight and the weight 178 is omitted from the support 250.

In the embodiment of FIGS. 10 and 11, because the portable electronic device 100 is coupled to the seat 152 via the connectors 194, 196, the fit of the portable electronic device 100 in the seat 152 may be less snug than in the previously described embodiment. In other words, one or more connectors may contribute to holding the portable electronic device 100 to the support 250.

Operation of the support 250 is similar to operation of the support 150, however, when the portable electronic device 100 is inserted into the device-receiving groove 160 of the support 250 by a user, the user typically first aligns mating connectors of the portable electronic device 100 with the connectors 194 and 196 of the support 250. When aligned, the user pushes the portable electronic device 100 and support 150 through the intermediate position into the horizontal position. In the horizontal position, because the support 250 abuts the surface on which the support 250 rests, the mating connectors are forced into engagement with the connectors 194, 196. The user then releases the portable electronic device 100 and the combined support 250 and portable electronic device 100 moves to the upright position, as described with respect to the embodiment of FIGS. 2-9.

Figure 14:
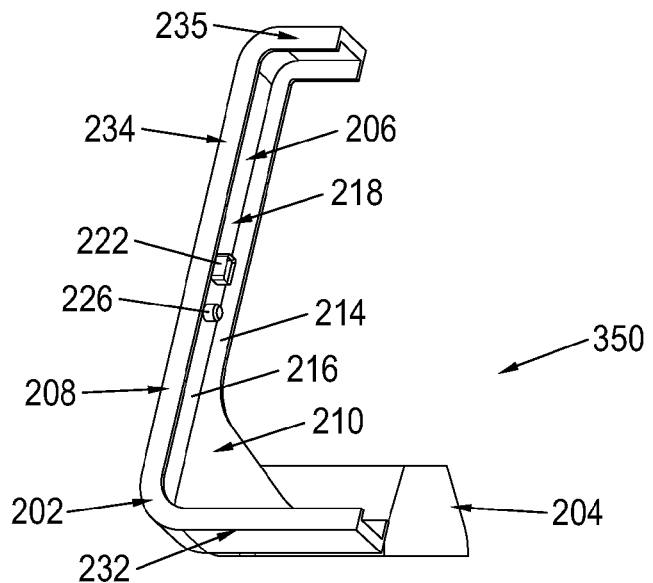
FIG. 14 is an isometric front view of a support according to another embodiment in which the support is in an upright position.
Figure 15:
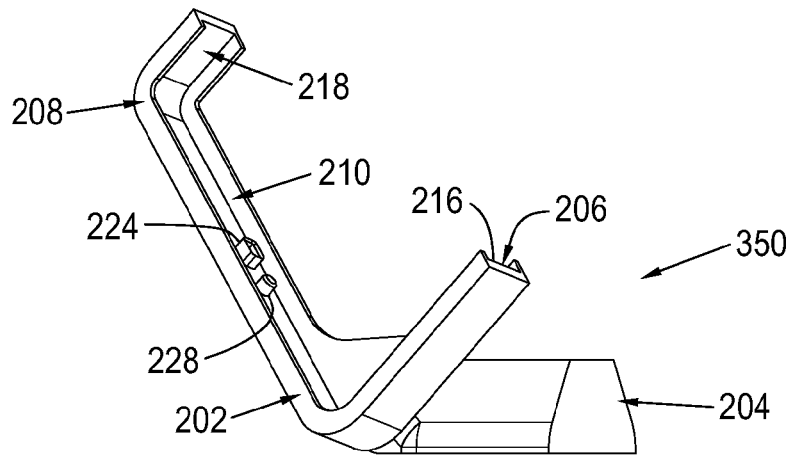
FIG. 15 is another front isometric view showing the support of FIG. 14 in an intermediate position.
Figure 16:
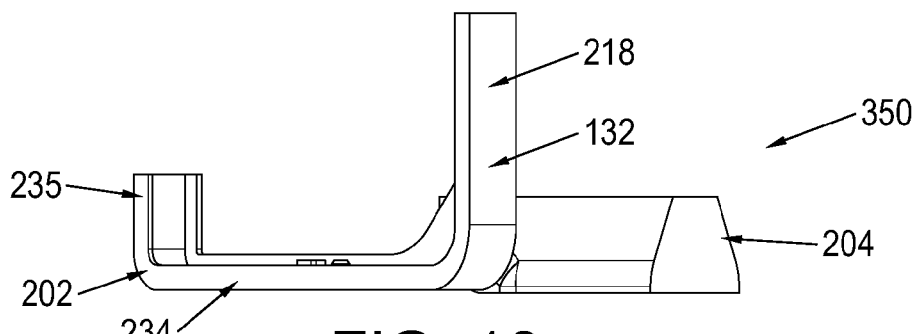
FIG. 16 is another front isometric view showing the support of FIG. 14 in a device-receiving position.

Referring now to FIGS. 14-16, another embodiment of a support 350 for receiving the portable electronic device 100, for example, is shown. Similar to the supports 150, 250 of the previous embodiments, the support 350 includes a seat 202 having a first portion 232 and a second portion 234 that extends generally at a right angle relative to the first portion 232, and a base 204. The base 204 is shaped so that the seat 202 may be tilted backward relative to the base 204 in the embodiment shown. A device-receiving groove 206 extends between a front wall 208 and a back wall 210 of the seat 202. The device-receiving groove 206 is sized for receiving a thickness of the portable electronic device 100. The groove 206 is defined by a back-facing surface 212, a back surface 214 and a side surface 216 of side wall 218, which extends between the front wall 208 and the back wall 210. The device-receiving groove 206 is generally upward facing when the support 150 is in a device-receiving position, which is shown in FIG. 16. The back wall 210 is sized to support a corner of the portable electronic device 100 so that the portable electronic device 100 does not fall out of the support 350 when the support 350 is in an upright position, which is shown in FIG. 14. The seat 202 further includes a return portion 235 that is coupled to the second portion 234 and extends substantially or strictly parallel to the first portion 232. Although optional, the return portion 235 facilitates location of the portable electronic device 100 in the seat 202.

Figure 17:
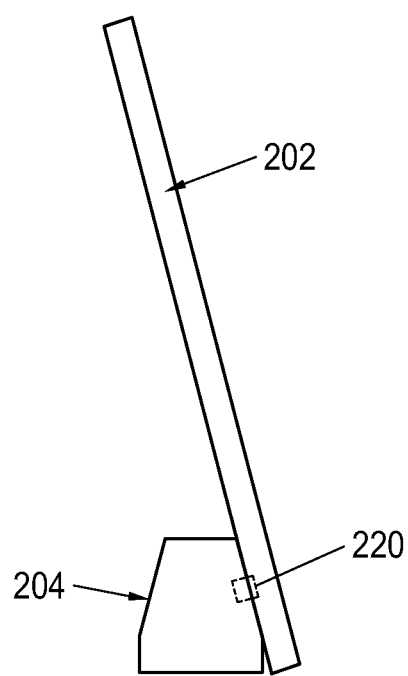
FIG. 17 is a schematic side view of the support of FIG. 14.

In the embodiment of FIGS. 14-16, the seat 202 is rotatable relative to the base 204. The base 204 is generally a weighted component that is stationary when the seat 202 rotates relative thereto. Referring also to FIG. 17, the seat 202 is mechanically coupled to the base 204 by a pin 220 and the seat 202 is rotatable relative to the base 204 about the pin 220. In the device-receiving position of FIG. 16, the first portion 232 may contact the surface on which the support 350 sits or may be maintained generally horizontal but above the surface on which the support 350 sits. Although a pin 220 is shown, any connecting part that connects the seat 202 to the base 204 and allows for relative rotation there between may be used.

A connecting portion of a first connector 222 extends through a first aperture 224 of the side wall 210. The first connector 222 may be a charging connector, a data connector or a connector capable of both charging and data transfer. The first connector 222 may support an electrical connection, an optical connection or a combination thereof. A connecting portion of a second connector 226 extends through the second aperture 228. Similar to the first connector 222, the second connector 226 may be a charging connector, a data connector or a connector capable of both charging and data transfer. The second connector 226 may support an electrical connection, an optical connection or a combination thereof. The first and second connectors 222 and 226 may be the same type or different types. The pin 220 may be hollow to provide a conduit for wiring of the first and second connectors 222, 226 to pass from the seat 202 to the base 204.

Figure 18:
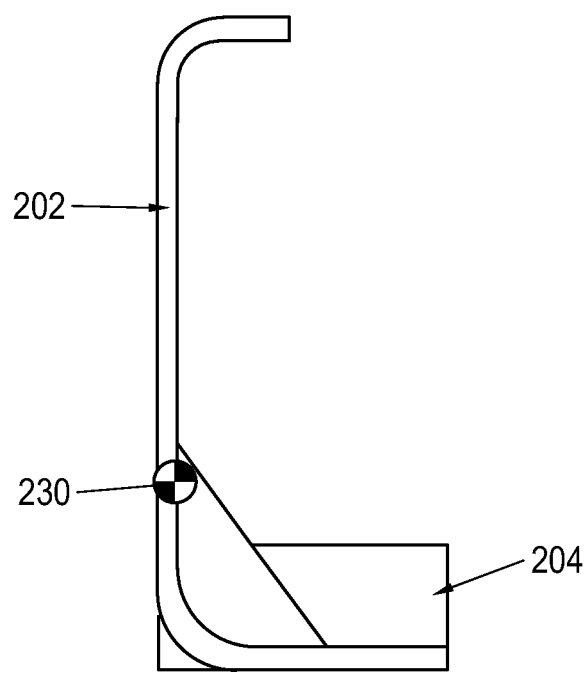
FIG. 18 is a schematic front view of the support of FIG. 14.

As shown in FIG. 18, the location of the centre of gravity of the support 350 is identified by reference numeral 230. Although the support 350 is shown in an upright position in FIGS. 14 and 18, this is not a rest position for the support 350. Because the centre of gravity 230 is located to the first portion 232 side of the pin 220, the support 200 is biased toward the device-receiving position of FIG. 16 when the portable electronic device 100 is not received in the support 350. When the portable electronic device 100 is received in the support 350, the location of the combined centre of gravity causes the support 350 to remain in the upright position when moved to the upright position.

Figure 19:
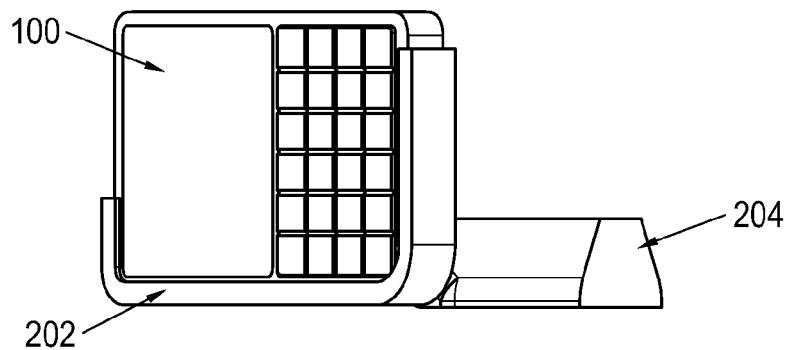
FIG. 19 is similar to FIG. 16 with a portable electronic device received in the support.
Figure 20:
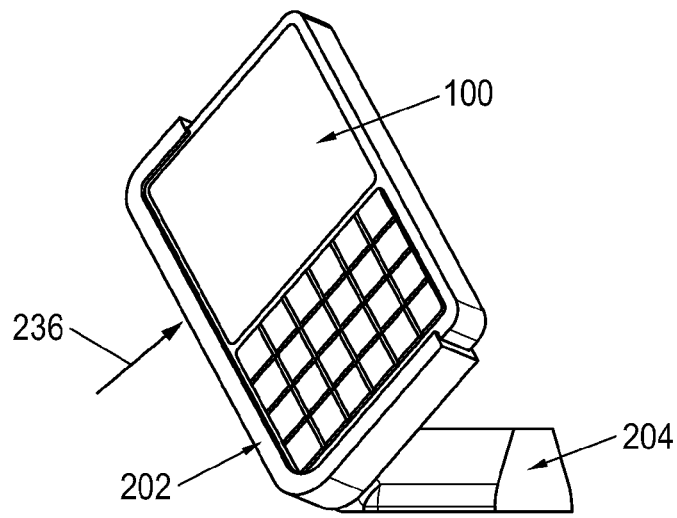
FIG. 20 is similar to FIG. 15 with the portable electronic device received in the support.
Figure 21:
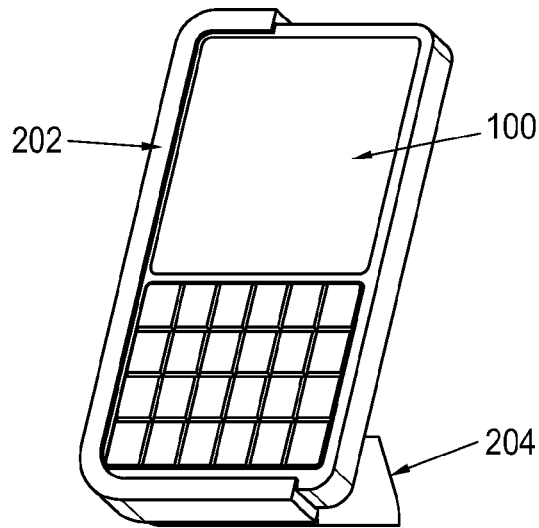
FIG. 21 is similar to FIG. 14 with the portable electronic device received in the support.

Operation of the support 350 will now be described with reference to FIGS. 19-21. As shown in FIG. 19, the support 350 rests in the device-receiving position and the user aligns mating connectors of the portable electronic device 100 with connectors 224, 226 and then inserts the portable electronic device 100 into the device-receiving groove 206 and applies a force to the portable electronic device in order to engage the connectors 224, 226 of the support 350. Once seated in the support 350, the user may leave the portable electronic device 100 in the landscape orientation or, as shown in FIG. 19, the user may apply a force to the portable electronic device 100 (indicated by arrow 236) toward the upright position of FIG. 21. When the seat 202 and portable electronic device 100 are in the upright position, the location of the combined centre of gravity of the support 350 and the portable electronic device 100 causes the support 200 to remain in the upright position without any additional force being applied by the user. In other words, gravity acts on the electronic device 100 and the support 350 so as to maintain the electronic device 100 and the support 350 in the upright position, even if there is minor disturbance. In the upright position, the user may view the portable electronic device 100 in a portrait orientation. When the portable electronic device 100 is removed from the support 350, the seat 152 rotates into the device-receiving position of FIG. 16 under its own weight due to the location of its centre of gravity. In other words, when the portable electronic device 100 is disengaged from the support 350, the support 350 returns to a device-receiving position, which may have a lower profile or otherwise be more convenient.

In the upright position, the second portion 234 of the seat 202 may be substantially upright or strictly upright causing the portable electronic device 100 received therein to be substantially upright or strictly upright. Substantially upright may be any position in which information on the display 112 that is displayed in the portrait orientation may be easily viewed by a user. Strictly upright is a position in which the second portion 158 is normal to a surface on which the support 150 sits.

In one embodiment, a damper may be coupled between the seat 202 and the base 204 in order to slow the movement of the seat 202 to the device-receiving position when the portable electronic device 100 is removed from the support 350 in the upright position. The damper may reduce the likelihood of damage to the electrical connectors 222, 226 when the seat 202 falls into the device-receiving position under its own weight. The damper may be a spring, for example.

In another embodiment, a torsional spring may be coupled between the seat 202 and the base 204 in order to facilitate user movement of the support 350 from the device-receiving position to the upright position. This may be useful when heavier portable electronic devices 100 are received in the support 350.

In another embodiment, the pin 220 may be replaced with a component that allows for rotation about two axes in order to maintain selected first and second tilts of the seat 202 relative to the base 204 in the device-receiving and upright positions respectively.

In another embodiment, the electrical connectors 222 and 226 are omitted so that the support 350 functions as a support without any charging or data transfer capabilities. In this embodiment, the pin 220 may be hollow or solid.

The supports disclosed herein facilitate easy location of the portable electronic device therein. Location of the portable electronic device in the supports disclosed herein may be performed using one hand. When a support is in a horizontal or device-receiving position, for example, the portable electronic device may be received or snugly fit in the support, and electrical and/or optical connections between the support and the portable electronic device (if any) may be established. A user may press the portable electronic device against the support, with the support pressing against a desk or other surface, and may thereby have the support receive the portable electronic device. In addition to facilitating easy docking of the portable electronic device, a support such as support 350 also allows for orientation of the portable electronic device 100 in either a landscape or a portrait orientation. In some embodiments, the docked portable electronic device may move into an upright position after docking, without further user action, without gears or springs or other moving parts, and without expenditure of electrical power. The upright position may be stable enough to support the portable electronic device while the user interacts with the portable electronic device by touching a touch screen, for example, or pressing keys. In other embodiments, the support may move automatically to a horizontal or device-receiving position when the portable electronic device is undocked, without expenditure of electrical power. Further, the support can be comparatively small and lightweight, making it convenient for travel. When not receiving a portable electronic device, some supports may assume a low profile on a desk (such as by naturally resting in a horizontal or device-receiving position) and perhaps be less conspicuous or more convenient. The portable electronic device may be readily engaged with and disengaged from the support without a need for tools.

The above-described embodiments are intended to be examples only. Although the drawings and descriptions often describe support embodiments used with a handheld device, there are no exact limits on size and weight of portable electronic devices or the supports. Alterations, modifications and variations can be effected to the particular embodiments by those of skill in the art without departing from the scope of the present application, which is defined solely by the claims appended hereto.

What is claimed is:

1. A support for receiving a portable electronic device, the support comprising:
   a base; and
   a seat mechanically coupled to the base and rotatable relative to the base, the seat comprising a first portion, a second portion and a device-receiving groove defined by a front wall, a back wall and a side wall, the side wall located between the front wall and the back wall, the second portion coupled to the first portion at a right angle and the seat being sized for receiving the portable electronic device and being movable, by rotation of the seat relative to the base, between a device-receiving position and an upright position;
   wherein a center of gravity of the seat is located to bias the seat toward the device-receiving position in which the device-receiving groove of the second portion is upward facing.

2. The support of claim 1, comprising an aperture for receiving an electrical connector, a surface defining the aperture extending through the side wall of the second portion.

3. The support of claim 1, wherein when the portable electronic device is received in the support and the support is in the upright position, a combined centre of gravity of the support and the portable electronic device causes the support to remain in the upright position.

4. The support of claim 1, wherein in the device-receiving position, the first portion of the support contacts a support surface on which the support sits.

5. The support of claim 2, wherein the electrical connector is for electrically communicating with the portable electronic device to enable one of: charging of a power pack of the portable electronic device and data communication with the portable electronic device.

6. The support of claim 1, wherein the second portion is coupled to the first portion at a right angle.

7. The support of claim 1, comprising a spring coupled between the seat and the base.

8. The support of claim 7, wherein the spring functions as a damper to slow rotation of the seat relative to the base when the seat moves from the upright position to the device-receiving position.

9. The support of claim 7, wherein the spring is a torsional spring to facilitate movement of the seat relative to the base from the device-receiving position to the upright position.

10. The support of claim 2, comprising a second aperture for receiving a second electrical connector, a second surface defining the second aperture extending at least partway through the side wall of the second portion.

11. The support of claim 10, wherein the second electrical connector is for electrically communicating with the portable electronic device to enable one of: charging of a power pack of the portable electronic device and data communication with the portable electronic device.

12. The support of claim 1, wherein the seat comprises a return portion coupled to the second portion, the return portion being substantially parallel to the first portion.

13. A support for receiving a portable electronic device and supporting the portable electronic device on a surface on which the support is located, the support comprising:
- a seat comprising a first portion, a second portion and a device-receiving groove defined by a front wall, a back wall and a side wall, the side wall located between the front wall and the back wall, the second portion coupled to the first portion at a right angle and the seat being sized for receiving the portable electronic device and movable between a device-receiving position and an upright position; and
- a base mechanically coupled to the seat and including a surface contacting wall comprising a curved portion and a flat portion, wherein the flat portion is in contact with the surface on which the portable electronic device is located when the portable electronic device is in the upright position, and wherein when the portable electronic device is moved out of the upright position by rotation of the base such that a part of the curved portion is in contact with the surface on which the portable electronic device is located, the seat and the base automatically rotate to return the portable electronic device to the upright position by the force of gravity acting on the support and the portable electronic device, wherein a center of gravity of the support is located to bias the support toward the device-receiving position.

14. The support of claim 13, wherein the device-receiving position and the upright position are the same.

15. The support of claim 13, wherein the support is one piece.

16. The support of claim 13, comprising an aperture for receiving an electrical connector, a surface defining the aperture extending through the side wall of the second portion.

17. The support of claim 13, comprising a weight coupled to the base.

18. The support of claim 13, wherein when the portable electronic device is received in the support and the support is in the upright position, a combined centre of gravity of the support and the portable electronic device causes the support to remain in the upright position.

19. The support of claim 16, wherein the electrical connector is for electrically communicating with the portable electronic device to enable one of: charging of a power pack of the portable electronic device and data communication with the portable electronic device.

20. The support of claim 16, comprising a second aperture for receiving a second electrical connector, a second surface defining the second aperture extending at least partway through the side wall of the upright portion.

* * * * *